E. GOEPPER.
CONTROLLING DEVICE FOR GAS LAMPS.
APPLICATION FILED JUNE 11, 1913.

1,100,727.

Patented June 23, 1914.
10 SHEETS—SHEET 1.

WITNESSES

INVENTOR
BY
ATTORNEYS

E. GOEPPER.
CONTROLLING DEVICE FOR GAS LAMPS.
APPLICATION FILED JUNE 11, 1913.

1,100,727.

Patented June 23, 1914.
10 SHEETS—SHEET 2.

E. GOEPPER.
CONTROLLING DEVICE FOR GAS LAMPS.
APPLICATION FILED JUNE 11, 1913.

1,100,727.

Patented June 23, 1914.
10 SHEETS—SHEET 3.

WITNESSES

INVENTOR

ATTORNEYS

E. GOEPPER.
CONTROLLING DEVICE FOR GAS LAMPS.
APPLICATION FILED JUNE 11, 1913.

1,100,727.

Patented June 23, 1914.
10 SHEETS—SHEET 4.

E. GOEPPER.
CONTROLLING DEVICE FOR GAS LAMPS.
APPLICATION FILED JUNE 11, 1913.

1,100,727.

Patented June 23, 1914.
10 SHEETS—SHEET 8.

E. GOEPPER.
CONTROLLING DEVICE FOR GAS LAMPS.
APPLICATION FILED JUNE 11, 1913.

1,100,727.

Patented June 23, 1914.
10 SHEETS—SHEET 9.

UNITED STATES PATENT OFFICE.

EMIL GOEPPER, OF MÜLHEIM-ON-THE-RHINE, GERMANY, ASSIGNOR TO DEUTSCHE GASGLUHLICHT AKTIENGESELLSCHAFT (AUERGESELLSCHAFT), OF BERLIN, GERMANY, A CORPORATION OF GERMANY.

CONTROLLING DEVICE FOR GAS-LAMPS.

1,100,727. Specification of Letters Patent. Patented June 23, 1914.

Application filed June 11, 1913. Serial No. 772,939.

*To all whom it may concern:*

Be it known that I, EMIL GOEPPER, a subject of the Emperor of Germany, and resident of Mülheim-on-the-Rhine, Germany, have invented certain new and useful Improvements in Controlling Devices for Gas-Lamps, of which the following is a specification.

My invention relates to controlling devices for gas lamps and more particularly to high pressure lamps which are operated either by compressed gas or compressed air and has for its object to provide a simple and efficient controlling device which may be operated from a distance to ignite or extinguish the lamps in any predetermined relation through the medium of an impulse or impulses of gas or air having a higher pressure than the pressure normally necessary to operate the lamps.

My invention further contemplates providing the controlling device with a single operating diaphragm adapted, under the influence of a pressure impulse, to become disconnected or uncoupled from the valve which controls the flame or flames to be extinguished, and to permit said valve to automatically close in any suitable manner as by means of a spring whereby the fuel supply is cut off and the predetermined flame or flames consequently extinguished.

My invention will be fully described hereinafter and the features of novelty will be pointed out in the claims.

Reference is to be had to the accompanying drawings which illustrate a number of examples of my invention and in which—

Figure 1:
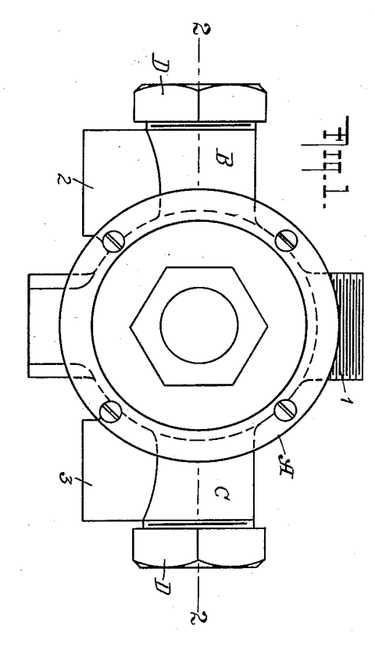
Figure 1 is an exterior view of one form of the controlling device in the position it occupies in a lamp.
Figure 2:
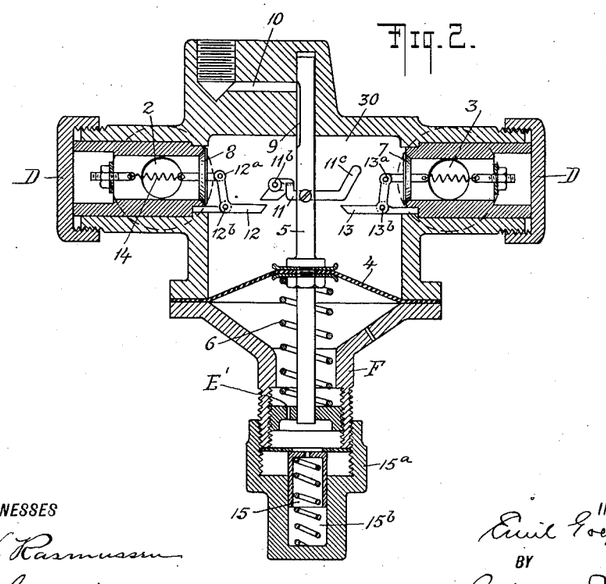
Figs. 2, 3, and 4 are sectional views thereof substantially on the line 2—2 of Fig. 1 and illustrating the parts in various successive operative positions.

Referring more particularly to Figs. 1 to 4 inclusive of the drawings the device comprises a suitable casing A having an inlet 1 preferably screw-threaded for connection with a source of fuel supply and communicating with a fuel chamber 30 shown for instance in Fig. 2. Tubular extensions B and C extend outwardly from the casing A and serve to connect the fuel chamber 30 with the outlets 2 and 3, the outlet 2 being adapted for connection with the burner or burners at which the light or lights are to be first extinguished and the outlet 3 being adapted for connection with the burner or burners at which the light or lights are to be extinguished last, or in other words, are to remain burning after the first light or lights have been extinguished. Each of the two extensions B and C is provided at its inner end with a valve seat for accommodating respectively the valves 7 and 8 whereby communication between the fuel chamber 30 and the outlets 2 and 3 is cut off or established, the said valves 7 and 8 being maintained in and returned to their closed positions in any suitable manner as for instance, by means of springs 14, the tension of which may be adjusted in any desirable way. The outer ends of the extensions B and C are preferably closed by means of removable caps D which may be removed to permit access to the interior of the said extensions for any purpose as for instance the adjustment of the springs 14. The valves 7 and 8 are pivotally connected at $12^a$ and $13^a$ respectively with bell cranks 12 and 13 pivoted respectively at $12^b$ and $13^b$ on suitable stationary portions of the casing A as shown in Fig. 2. A rod 5 has one end slidably mounted in the casing A and its other end slidable in an internal cap E screwed into a neck F forming part of the casing A and having a vent E′ the purpose of which will appear more fully hereinafter. The rod 5 is secured to a diaphragm 4 located in the chamber 30 which diaphragm and with it the rod 5 are maintained in the normal position of rest shown in Fig. 2 by means of a spring 6, bearing respectively against the one surface of the diaphragm clamp and the cap E. The rod 5 carries a follower 11 which at the left hand side looking at Fig. 2 carries a dog 11ª pivoted at 11ᵇ and free to move relatively to the follower 11 in one direction and rigid therewith in the other direction. At the opposite or right hand side in Fig. 2 the follower 11 is provided with a rigid inclined extension 11ᶜ. The free shanks of the bell-cranks 12 and 13 are respectively in the path of the said dog 11ª and the extension 11ᶜ and under certain conditions are actuated thereby as will appear more fully farther on in the description. The rod 5 is further provided with a channel or recess 9 which in the normal position of the parts establishes communication between the fuel chamber 30 and a passage 10, the latter being connected in any well known manner with a pilot light of any suitable type. A cap 15ª is arranged to screw upon the neck F and is provided with a reduced chamber 15ᵇ in which a cup or the like 15ᶜ is slidably mounted, said cup serving as a bearing for one end of a supplemental spring 15 the other end of which bears against an inner surface of the cap 15ª. The cup 15ᶜ is arranged in alinement with an opening in a washer 15ᵈ located at the end of the neck F which washer limits the expansion movement of the said spring 15, the said cup 15ᶜ being further in axial alinement with the rod 5 and being normally located at a distance therefrom as shown for instance in Fig. 2.

Figure 3:
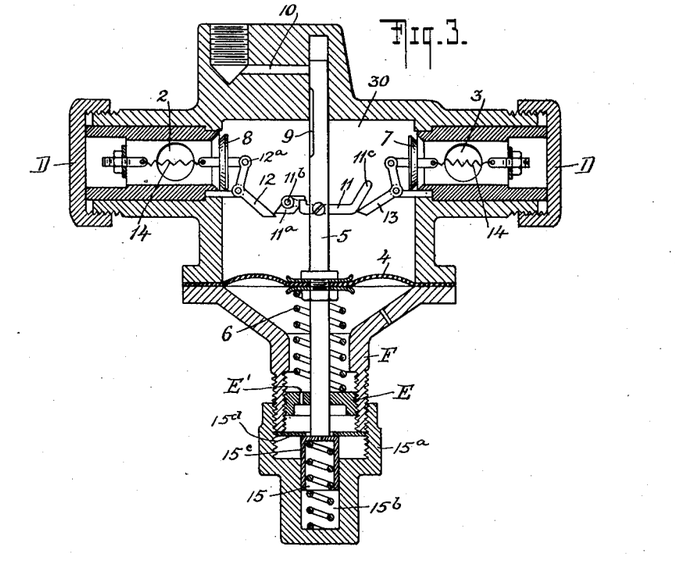
Figure 4:
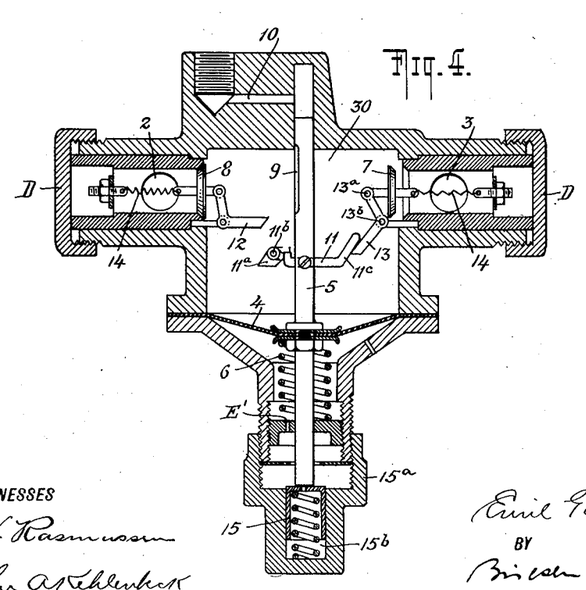
Figure 5:
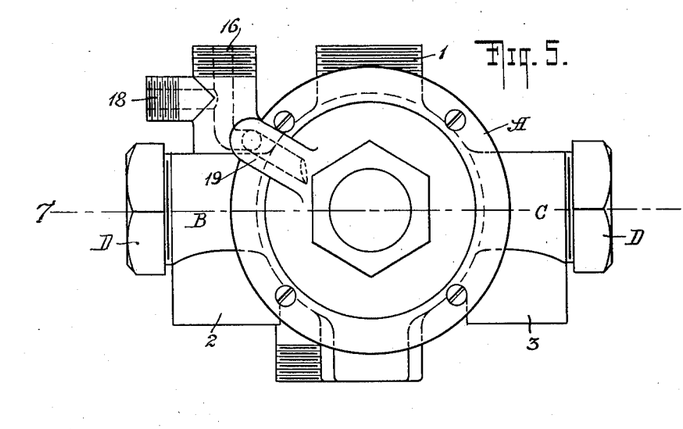
Fig. 5 is a view similar to Fig. 1 of another form of my improvement.
Figure 6:
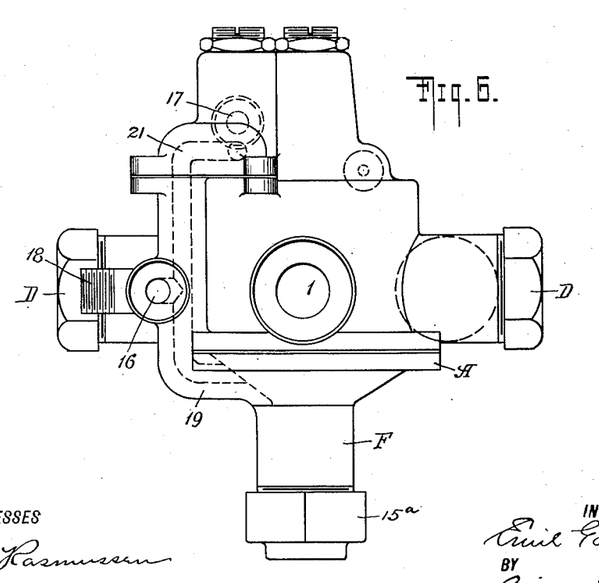
Fig. 6 is a plan view thereof.

In this form of my invention the position of rest of the parts is as shown in Fig. 2, which condition remains as long as a low pressure is maintained in the mains. In the said condition of the parts no gas or other fuel can pass from the fuel chamber 30 to the outlets 2 and 3, but can pass only from the fuel chamber 30, through the recess 9 and passage 10 to the pilot burner which in this manner is supplied with fuel and kept burning. If the pressure of the gas or other fuel in the mains is now increased to the high pressure necessary to properly operate the lamp or lamps the said fuel at this high pressure will pass through the inlet 1 to the chamber 30 and will move the diaphragm 4 to the position shown in Fig. 3 or until the resistance or tension of the spring 6 is equal to and balances the pressure of the fuel exerted on the diaphragm 4 in the chamber 30. This actuation of the diaphragm 4 will slidably move the rod 5 in the direction of its length until its one end abuts against the cup 15ᶜ and at the same time will bring about a similar movement of the follower 11. During this movement of the follower 11 the free shanks of the bell-cranks 12 and 13 are engaged by the dog 11ª and the rigid inclined extension 11ᶜ and as the dog 11ª is rigid relatively to the follower 11 in this direction of movement, the two bell cranks 12 and 13 will be rocked on their respective pivots and the valves 7 and 8 consequently moved to an open position as shown in Fig. 3. In this condition of the parts the gas or other fuel passes through the outlets 2 and 3 and to the respective burners and is there ignited by the pilot burner or flame, it being understood that the gas or other fuel reaches the burners and becomes ignited before the rod 5 has been moved far enough to disconnect the recess 9 and passage 10 and therefore before the pilot light has been extinguished. If a pulsation or wave of fuel at a pressure greater than the high pressure necessary to properly operate the lamps is now caused to pass through the mains or conduits, the same will enter the chamber 30 and will additionally move the diaphragm 4 to the position shown in Fig. 4 and will consequently cause a further lengthwise movement of the rod 5 and follower 11 and will further compress the spring 6 and at the same time compress the spring 15. This additional movement of the diaphragm 4 and its connected parts will continue until the increased pressure in the chamber 30 is balanced by the combined tension of the springs 6 and 15 as shown in Fig. 4, whereupon further movement of the parts will cease. This additional movement of the diaphragm and rod is of sufficient extent to remove the dog 11ª from engagement with the free shank of the bell crank 12, so that the valve 8 being unrestrained is now returned to its closed position under the influence of its spring 14. The movement, however, is not sufficient to disengage the inclined extension 11ᶜ from the free shank of the bell crank 13 so that the valve 7 is still maintained in an open position. Communication between the chamber 30 and the outlet 2 has in this manner been cut off and all of the lights which are connected with said outlet 2 are in consequence extinguished, while those lights which receive their supply of fuel through the outlet 3 are still burning. As the impulse or wave of increased fuel pressure is terminated and the normal high pressure necessary to properly operate the lamps again exists in the chamber 30, the diaphragm 4 and its connected parts will return to the position shown in Fig 3. During this return movement the dog 11ª being free to move relatively to the follower 11 in this direction of movement has simply been swung on its pivot 11ᵇ and has passed the free shank of the bell crank 12 without causing any actuation thereof, the valve 7 being still maintained in its open position owing to the continued coöperation of the inclined extension 11ᶜ and the free shank of the bell crank 13, so that the lights which are connected with the outlet 3 still remain burning.

If the pressure in the mains or conduits drops to ordinary pressure or below the high pressure necessary to properly operate the lamps, the tension of the spring 6 will be greater than the pressure in the chamber 30 and the said spring will consequently return the diaphragm 4 and its connected parts to the initial position illustrated in Fig. 2. The inclined extension 11ᶜ has by this return movement been removed from engagement with the free shank of the bell crank 13 and the valve 7 being now unrestrained is immediately returned to its closed position through the medium of its spring 14 and the supply of gas cut off from the outlet 3. The lights which are connected with this outlet 3 will therefore now also be extenguished. During the actuation of the diaphragm as described, the air on the one side thereof will be displaced through the vent E' of the cap E.

Figure 7:
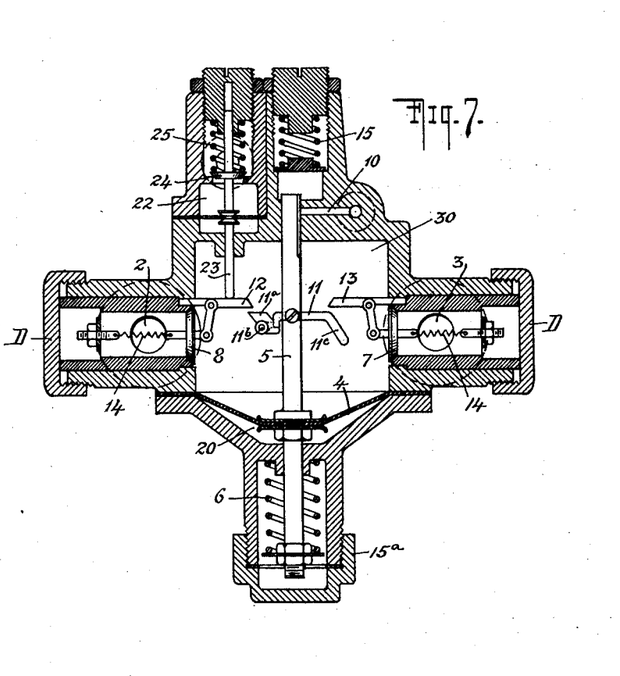
Figs. 7, 8 and 9 are sectional views on the line 7—7 of Fig. 5 and show the parts of this form of my improvement in different successive operative positions.

Reference is now made more particularly to Figs. 5 to 9 inclusive of the drawings which show a form of controlling device adapted specially for high pressure air lamps, that is, lamps in which the gas or other fuel is supplied at normal pressure and all or a portion of the air necessary for proper combustion is supplied under pressure. In this form of device the casing A in addition to the inlet 1 and outlets 2 and 3 is provided with an inlet 16 adapted for connection with a source of air supply, a channel 19 extending from said inlet 16 to a chamber 20 located on that side of the diaphragm which is opposite to the fuel chamber 30. A second channel 21 connects said inlet 16 with a valve chamber 22 having a valve seat for the accommodation of a valve 24 which according to its position either cuts off or establishes communication between said valve chamber 22 and an outlet 17 adapted for connection with those burners which are in communication with the outlet 2. The said valve 24 is maintained on and returned to its seat by means of a spring 25 and is further mounted on a rod 23, one end of which is located in close proximity to the free shank of the bellcrank 12. A branch 18 extends from the inlet 16 and is adapted for connection with those burners which are in communication with the outlet 3. In this form of my invention the diaphragm 4 is normally depressed as shown in Fig. 7 and the operative movement thereof and of the rod 5 and follower 11 with its connected parts is in a reverse direction from that shown for instance in Fig. 2. The remaining parts of the device may be substantially the same as in the first form of my improvement, it being understood that in this second form, the outlet 2 is also connected with those burners at which the lights are to be first extinguished while the outlet 3 communicates with those burners at which the lights are to be last extinguished. The position of rest of the parts of this form of my improvement is, as shown in Fig. 7, the diaphragm 4, remaining in the position illustrated as long as the normal air pressure exists in the conduits or mains and in the chamber 20. If air under the pressure necessary to properly operate the lamps is forced through said mains or conduits, the said air will pass through the inlet 16 and the channel 19 into the chamber 20. The pressure exerted by said air will move the diaphragm 4 to the position shown in Fig. 8 or until the tension of the spring 6 balances the force exerted by said air under pressure in which condition the end of the rod 5 is in engagement with the spring 15. This movement of the diaphragm 4 having operated the rod 5 and follower 11 will cause the dog 11ᵃ and the inclined extension 11ᵇ to press against the free shanks of the bell cranks 12 and 13 whereby the valves 7 and 8 are opened in the same manner as in the first form of my invention and fuel consequently passes from the chamber 30 through the outlets 2 and 3 to the burners. The fuel becomes ignited at the burners through the medium of the pilot flame in the same way as hereinbefore described. At the same time the actuation of the bell crank 12 has caused a lengthwise movement of the rod 23 and has consequently moved the valve 24 to an open position against the tension of the spring 25 so that air may now pass from the chamber 22 through the channel 21 and outlet 17 to those lights which are connected with the outlet 2. The lights connected with the outlet 3 receive their supply of air through the connection with the branch 18 which communicates with the air inlet 16.

Figure 9:
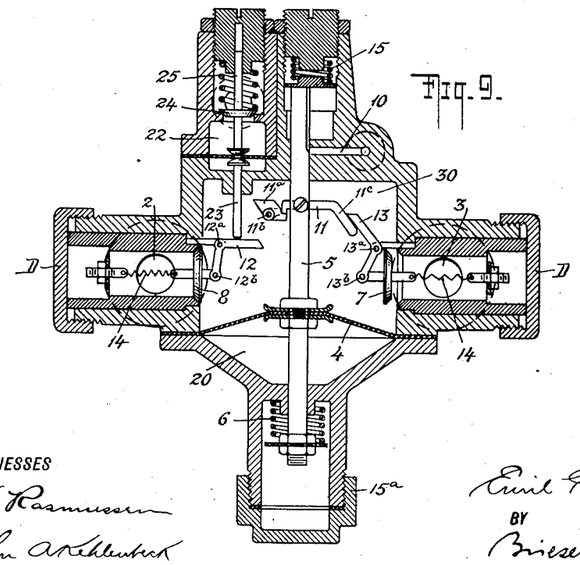

If a pulsation or wave of air at a pressure greater than the normal high pressure required for the proper operation of the lamps is now caused to pass through the mains or conduits, the same will pass through the inlet 16 and channel 19 into the chamber 20 and thus gives the diaphragm 4 an additional movement to the position shown in Fig. 9, this additional movement ceasing when the combined tension of the springs 6 and 15 equals the force exerted by said increased pressure wave. This further actuation of the diaphragm 4 causes a similar further movement of the rod 5 and the follower 11 and causes the dog 11ᵃ to glide from the free shank of the bell-crank 12, thus freeing the same and permitting the valve 8 to be returned to its closed position by means of its spring 14. At the same time the spring 25 has returned the valve 24 to its seat and in consequence the chamber 30 has been cut off from the outlet 2 and the chamber 22 has been cut off from the outlet 17, so that both the fuel and air supply to those burners which are connected with the outlet 2 has been shut off and the lights at these burners consequently extinguished. The described additional movement of the parts is not sufficient however, to disengage the inclined extension 11ᶜ from the free shank of the bell-crank 13 so that the valve 7 is still maintained in its open position and the lights which receive their fuel supply through the outlet 3 are still burning.

Figure 8:
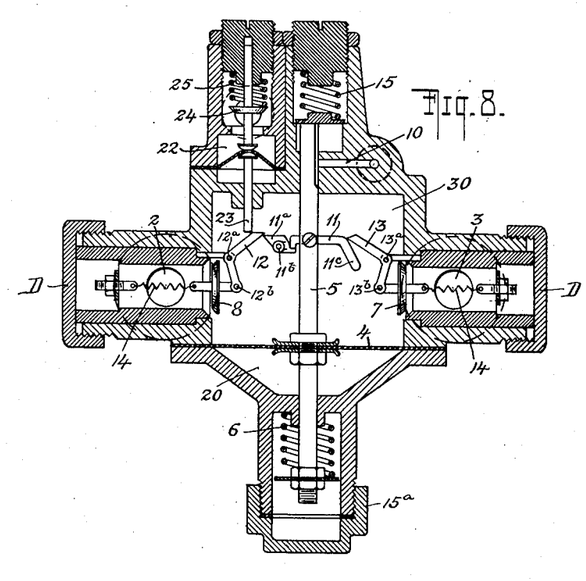

After the pulsation or pressure wave of increased pressure has subsided and the normal high pressure necessary to properly operate the lamps again exists in the chamber 20, the diaphragm 4 and its connected parts will return to the position shown in Fig. 8. During this return movement the dog 11ᵃ being free to move relatively to the follower 11 in this direction simply passes by the free shank of the bell crank 12 without affecting the same in any way and without changing the position of the valves 8 and 24. The inclined extension 11ᶜ still remains in contact with the free shank of the bell-crank 13 so that the valve 7 still remains open and the lights connected with the outlet 3 still remain burning. If the normal high pressure necessary to properly operate the lamps is now reduced to normal or low pressure the diaphragm 4 and its connected parts will, under the influence of the spring 6, be returned to the initial position of rest shown in Fig. 7 and the inclined extension 11ᶜ will be removed from engagement with the free shank of the bell-crank 13. The valve 7 being now free from restraint is closed by means of its spring 14 and the lights connected with the outlet 3 are in consequence also extinguished owing to the fact that the fuel supply thereto is cut off. Thus in both of the forms of my device so far described the lights after having been ignited by means of pilot lights as soon as the fuel or air at the normal high pressure necessary to properly operate the lamps has been caused to pass through the mains or conduits, may be extinguished in part by simply sending a pulsation or wave of fuel or air at a pressure higher than the normal high pressure through the mains or conduits and the remaining lights may be extinguished by simply reducing the pressure of the fuel or air below that necessary to properly operate the lamps. As stated with both of these forms it is necessary to completely remove the high pressure of fuel or air in order to extinguish the second light or set of lights, an arrangement which under certain conditions is objectionable. That is, for instance, certain lamps which may be intended for special use at particular times and which are to remain burning for instance after the lamps referred to have been extinguished as described cannot be connected with the same mains or conduits with which the lamps to be extinguished successively as above described are connected. To overcome this objection and these disadvantages I provide the forms of device as shown for instance in Figs. 10 to 15 inclusive. These last named forms differ from those already described essentially only in that the controlling means is not directly connected with or operated by the diaphragm, but is actuated by means of an intermediate means as for instance a pawl and ratchet wheel which is operated by the diaphragm.

Figure 12:
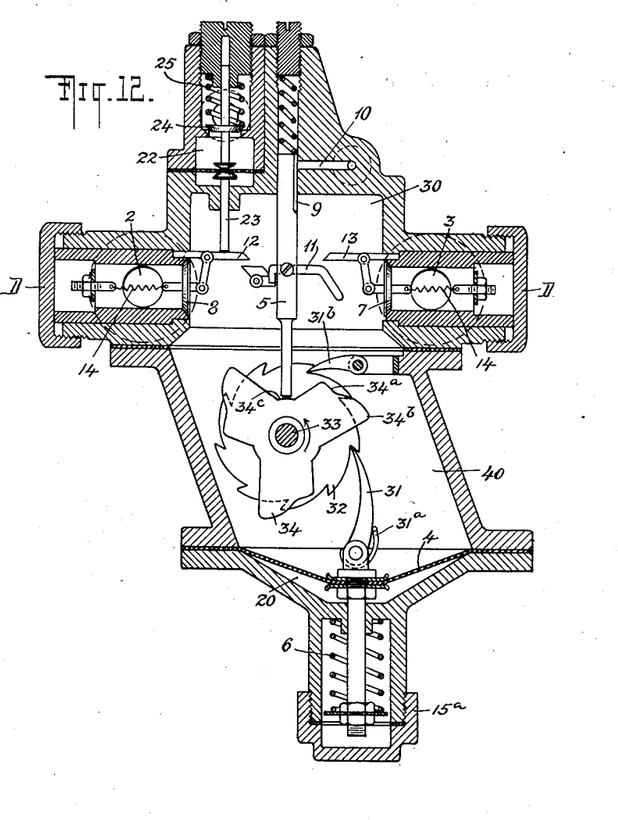
Figs. 12, 13 and 14 are sectional views on the line 12—12 of Fig. 10 illustrating the parts of this form of my device in various successive operative positions.
Figure 13:
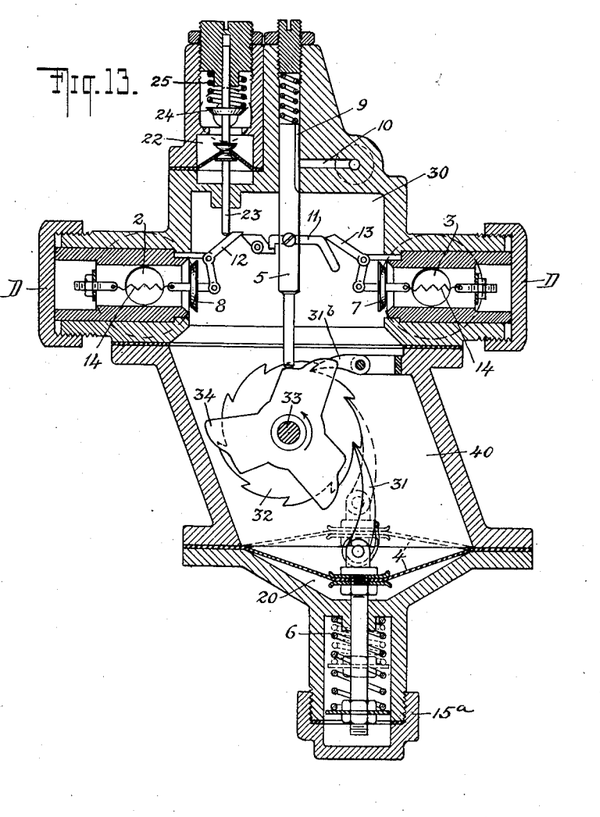
Figure 14:
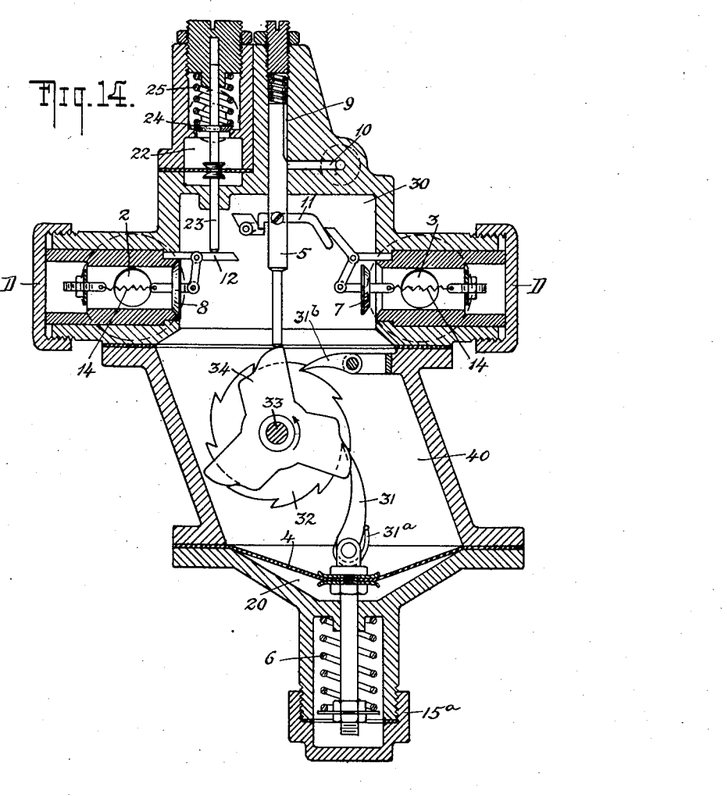
Figure 15:
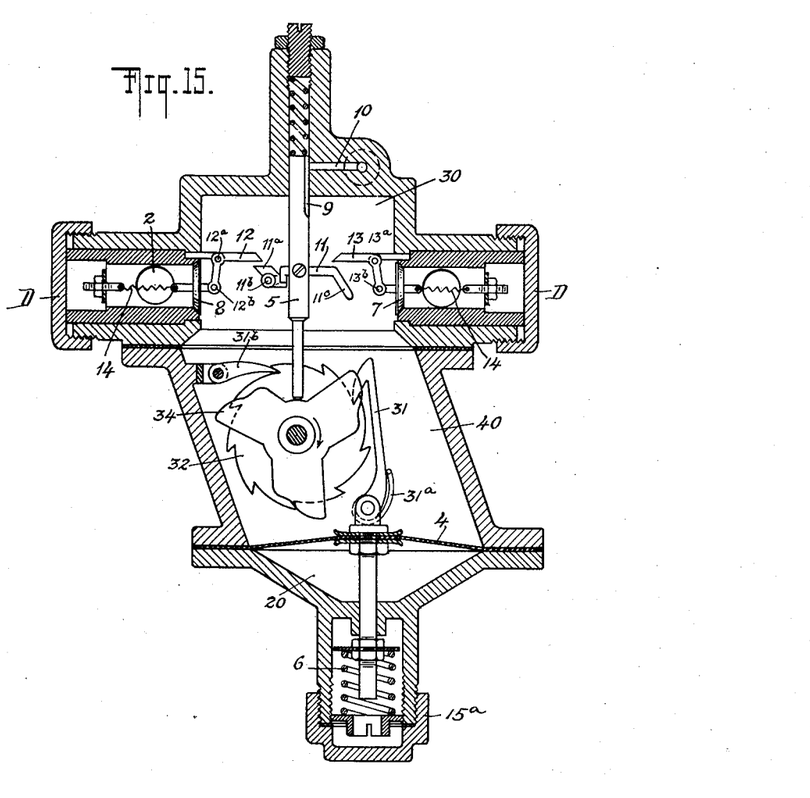
Fig. 15 is a similar sectional view of a further form of my improvement.

Referring now more particularly to Figs. 10 to 14 inclusive of the drawings it will be seen that in the main the device as shown is the same as the high pressure air lamp controller shown in Figs. 5 to 9 inclusive, although it is to be understood that the detail mechanism about to be described may for instance as illustrated in Fig. 15 also be applied to the high pressure gas lamp controller shown in Figs. 1 to 4 inclusive. As shown for instance in Fig. 12 a shaft 33 is journaled in the fuel chamber 30 and carries a ratchet wheel 32 and a cam-wheel 34 having spaced projections 34ᵃ and 34ᵇ and depressions 34ᶜ. The diaphragm 4 in this case carries or is connected with a pawl 31 held in operative engagement with the ratchet wheel 32 in any suitable manner as by means of a spring 31ᵃ, a stop pawl 31ᵇ or similar device being preferably provided to prevent backward movement of the ratchet wheel 32. The parts are shown in the position of rest in Fig. 12 in which condition only the pilot lights are burning, fuel being supplied thereto from the fuel chamber 30 through the recess 9, and channel 10. In this form of my invention the spring 6 is of sufficient tension to prevent an actuation of the diaphragm 4 even after the air at the normal high pressure necessary to properly operate the lamps has been conducted to chamber 20, so that this high pressure air may be utilized to operate lamps other than those controlled as described or for other purposes. When it is desired to ignite the lamps which are provided with the controlling device illustrated a pulsation or wave of air at a pressure higher than the normal high pressure is caused to pass through the mains or conduits. This pulsation or wave passes through the inlet 16 and channel 19 to the chamber 20 and moves the diaphragm 4 to the position shown in dotted lines in Fig. 13. This will also bring about an operation of the pawl 31 which will in turn rotate the ratchet wheel 32 one tooth and with it the shaft 33 and cam wheel 34, and will in consequence move the end of the rod 5 from a depression 34ᶜ and shift said rod 5 lengthwise until the said end thereof rests against one of the projections 34ᵃ as shown in Fig. 13. The follower 11 having been carried along as the rod 5 is thus operated, the dog 11ᵃ being rigid relatively to the follower 11 in this direction of movement and the rigid extension 11ᶜ will actuate the bell cranks 12 and 13 and will accordingly open the valves 7 and 8 and permit fuel to travel from the fuel chamber 30 to the respective burners, where the same will become ignited from the pilot burner before the same is cut off from the fuel chamber 30 through the movement of said rod 5. At the same time the valve 24 having been opened, through the coöperation of the bell-crank 12 and rod 23, air will pass from the chamber 22, through the channel 21 and outlet 17 to the burners which are connected with the outlet 2, air being supplied to the burners which communicate with the outlet 3 through the connection with the branch 18. After the said pulsation or wave of air at increased pressure is discontinued the diaphragm 4 returns to the position shown in solid lines in Fig. 13 under the influence of the spring 6 and the end of the pawl 31 slides back over the periphery of the ratchet wheel 32 and becomes lodged beneath another tooth thereof. This return movement of the diaphragm 4 and pawl 31 has no effect on the ratchet wheel 32 and cam-wheel 34 which are held against accidental rearward movement by the stop-pawl 31ᶜ. If a second pulsation or wave of air at a pressure above the normal high pressure is caused to pass through the mains or conduits the same will enter the chamber 20 through the inlet 16 and channel 19 and the diaphragm 4 will be again moved as before to the position shown in dotted lines in Fig. 13 and the pawl 31 will rotate the ratchet wheel 32 one tooth farther and will correspondingly rotate the shaft 33 and cam-wheel 34, the latter being by this operation brought to the position shown in Fig. 14. This movement causes one of the projections 34ᵇ to shift the rod 5 farther along in an axial direction against the tension of the spring 15 and causes the dog 11ᵃ to glide from the free shank of the bell crank 12 and permits the spring 14 to return the valve 8 to its closed position. At the same time the spring 25 will return the valve 24 to its closed position so that at the end of this operation the fuel and air are cut off from these burners which are connected with the outlets 2 and 17 and the lights at said burners are consequently extinguished. The lights which are connected with the outlet 3 and the branch 18 are however still burning owing to the fact that the described additional movement of the rod 5 and its connected parts is not sufficient to disconnect the inclined extension 11ᶜ from the free shank of the bell-crank 13 and the valve 7 consequently still remains in its open position. As soon as the said second pulsation or wave of increased pressure is discontinued and the pressure of the air returns to the normal high pressure necessary to properly operate the lamps, the said diaphragm 4 will return to the position shown in Fig. 14 and the pawl 31 will ride back over the periphery of the ratchet wheel 32 and become seated beneath still another tooth thereof. This return of the diaphragm 4 and pawl 31 also has no effect on the ratchet wheel 32 and cam-wheel 34, the stop-pawl 31ᵇ preventing rearward movement of these parts so that the valve 8 remains closed and the valve 7 remains open as described. If a third impulse or wave of a pressure greater than the normal high operating pressure is now caused to pass through the mains or conduits, the same will reach the chamber 20 through the inlet 16 and channel 19 and the diaphragm will be moved a third time and will cause the pawl 31 to rotate the ratchet wheel 32 forward another tooth. The shaft 33 and cam-wheel 34 will again be similarly rotated and the rod 5 will be returned to a depression 34ᶜ by means of the spring 15 or in other words the said rod and its parts will resume their initial position shown in Fig. 12. The dog 11ᵃ being free to move relatively to the follower 11 in this direction of movement as in the other forms simply passes the free shank of the bell crank 12 without affecting the same. At the same time the inclined extension 11ᶜ is moved away from the free shank of the bell-crank 13 and the valve 7 thus permitted to close under the influence of its spring 14. In this manner the supply of fuel is cut off from those burners which are connected with the outlet 3 and the lights thereat accordingly extinguished. In this condition of the parts in this form of my invention as well as the corresponding position in that form thereof shown in Figs. 5 to 9 inclusive air still flows through the branch 18 to the connected burners in a quantity however, which is more or less insignificant. If desired the stream of air can also be cut off at the proper time in any suitable manner as will be readily apparent without further explanation. For instance, the bell crank 13, may be connected with a valve arrangement similar to the valve 24 actuated and controlled by the bell-crank 12. If the third impulse or wave of increased pressure is discontinued and the pressure permitted to return to the normal high operating pressure the diaphragm 4 and its connected parts will return to the initial position of rest as shown in Fig. 12, so that when the next impulse or wave of higher pressure is caused to pass through the conduits or main the operation of the controlling device will again commence from the beginning.

Figure 10:
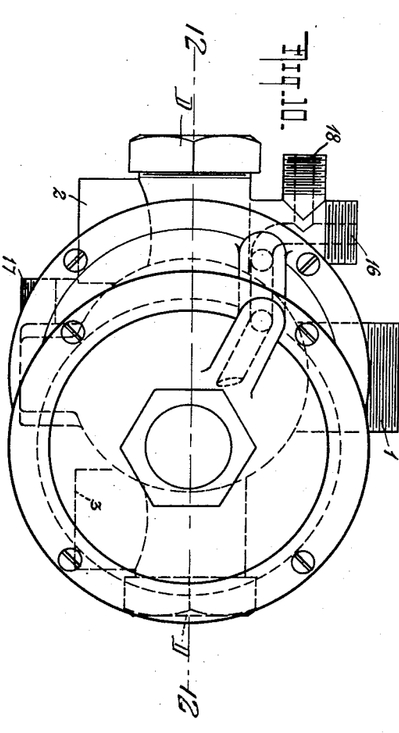
Figs. 10 and 11 are views similar to Figs. 5 and 6 of still another form of my device.
Figure 11:
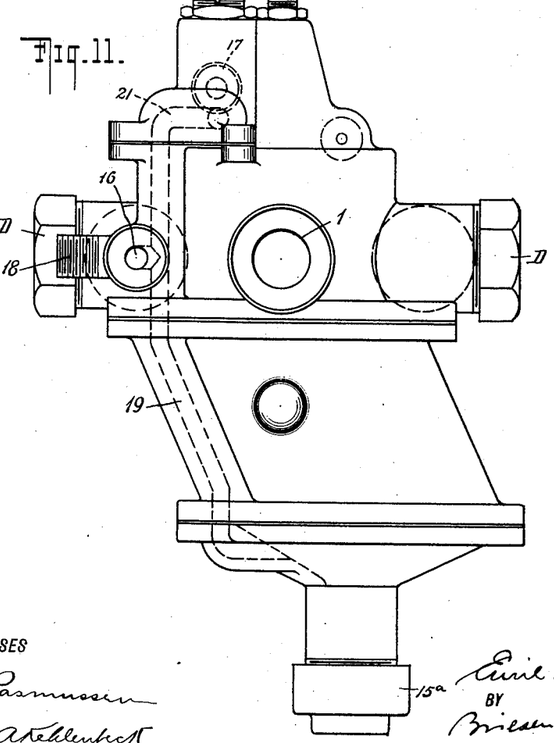

In the form of my invention as shown in Fig. 15 the diaphragm 4 is normally in the position shown in Fig. 2 and the spring 6 is of sufficient tension to prevent an actuation of said diaphragm by the fuel in the chamber 40 when at the normal high pressure necessary to properly operate the lamps in the same way as in Figs. 10 and 14 inclusive. The diaphragm 4 in this form also carries a pawl 31 which coöperates with the ratchet wheel 32, but instead of being a push pawl is a pull pawl, the teeth of the ratchet 32, facing in the reverse direction from those of the ratchet 32 in Fig. 12 to secure the proper coöperation with said last named pawl. The operation of this form of my device will be readily apparent and is essentially the same as that of the form illustrated in Figs. 10 to 14 inclusive with the exception that the diaphragm 4 instead of being actuated by pulsations or waves of air of increased pressure, is operated by pulsations or waves of fuel of increased pressure entering the fuel chamber 40 which corresponds to the fuel chamber 30 of the former types of my device illustrated.

It will be seen in both of the last two forms described that the normal high pressure of fuel or air necessary to properly operate lamps of the types especially under consideration may be maintained in the mains or conduits and in the fuel chambers 30 and 40 without affecting an operation of the diaphragm 4 and connected parts. With these two forms it is thus possible to connect with the mains or conduits any number of lamps or other devices requiring fuel or air under high pressure but not intended to be controlled as described, without interference therewith or without conflicting with the lamps which are intended to be controlled as described.

In its details the invention need not be confined to the illustrated forms. For example instead of the illustrated plate or disk valves, other suitable valves may be substituted or used. Further the cutting off of the pilot flame or light may also be accomplished in ways other than as shown and a special valve for controlling said pilot light may be substituted for the recess 9 in the rod 5, which valve may be operated at the proper time through the medium of suitable controlling members.

One of the essentials of the improvement is simply that one of the two fuel controlling valves be disconnected or uncoupled from the diaphragm or diaphragm rod at the proper time through the medium of a predetermined pulsation or wave of fuel or air of a pressure higher than the normal high pressure necessary to properly operate the lamp. If the controlling device is to be used only for single flame lamps and if every alternate or second lamp is to be first extinguished with the aid of the pulsation or wave of increased pressure, then for these lamps the valve 7 is omitted and the outlet 3 is closed or sealed in any suitable manner.

Various other changes in the specific forms shown and described may be made within the scope of the claims without departing from the spirit of my invention.

I claim:

1. A device for controlling gas lamps from a distance comprising a casing having an inlet for a gaseous fluid and an outlet leading to a burner, a valve located in said casing and controlling said outlet, a rod slidingly mounted in said casing, a follower carried by said rod, the latter being movable in one direction to a first position to cause said follower to open said valve and being further movable in the same direction from said first position to another position to bring about a closure of said valve and a diaphragm actuated by said fluid to slidably move said rod and follower.

2. A device for controlling gas lamps from a distance comprising a casing having an inlet for a gaseous fluid and an outlet leading to a burner, a valve located in said casing and controlling said outlet, a rod slidably mounted in said casing, a follower carried by said rod and adapted to connect the same with said valve, a diaphragm connected with said rod and adapted to be actuated by said fluid to slidably move said rod and follower whereby said valve is opened, said diaphragm being adapted to be further actuated by a pulsation of fluid of increased pressure whereby said rod and follower are given an additional movement and uncoupled from said valve and a spring for returning said valve to its closed position after it has been uncoupled from said follower and rod.

3. A device for controlling gas lamps from a distance comprising a casing having an inlet for a gaseous fluid and an outlet leading to a burner, a valve located in said casing and controlling said outlet, a pivoted bell crank connected with said valve, a rod slidably mounted in said casing, a follower carried by said rod, a pivoted dog carried by said follower and arranged to connect the same with said bell crank, a diaphragm connected with said rod and adapted to be actuated by said fluid to slidably move said rod and follower whereby said bell crank is rocked to open said valve, said diaphragm being adapted to be further actuated by a pulsation of fluid of increased pressure whereby said dog is caused to glide from said bell crank to disconnect the same from said dog and a spring for returning said valve to its closed position after said bellcrank and dog have been disconnected.

4. A device for controlling gas lamps from a distance comprising a casing having an inlet for a gaseous fluid and a plurality of outlets each leading to a burner, valves located in said casing and controlling said outlets, a rod slidably mounted in said casing, a follower carried by said rod and adapted to open and close said valves by a two-part movement of said rod in the same direction, whereby the first part of said movement opens said valves and the further movement in the same direction permits some of said valves to close and some to remain in their open positions.

5. A device for controlling gas lamps from a distance comprising a casing having an inlet for a gaseous fluid and a plurality of outlets each leading to a burner, valves controlling said outlets, pivoted bell cranks connected with said valves, a rod slidably mounted in said casing, a follower carried by said rod, a pivoted dog carried by said follower and arranged to connect one of said bell-cranks with said rod, an inclined extension on said follower for connecting the other bell crank with said rod, and a diaphragm connected with said rod and adapted to be actuated by said fluid to slidably move said rod whereby said dog and inclined extension are caused to rock said bell-cranks and open said valves, said diaphragm being adapted to be further actuated by a pulsation of fluid of increased pressure whereby said dog is caused to glide from its coöperating bell crank to permit the coöperating valve to close, the inclined extension remaining in contact with its coöperating bell crank and retaining the coöperating valve in its open position.

6. A device for controlling gas lamps from a distance comprising a casing having an inlet for a gaseous fluid and a plurality of outlets each leading to a burner, valves controlling said outlet, pivoted bell cranks connected with said valves, a rod slidably mounted in said casing, a follower carried by said rod, a pivoted dog carried by said follower and arranged to connect one of said bell-cranks with said rod, an inclined extension on said follower for connecting the other bell crank with said rod, a diaphragm connected with said rod and adapted to be actuated by said fluid to slidably move said rod whereby said dog and inclined extension are caused to rock said bell-cranks and open said valves, said diaphragm being adapted to be further actuated by a pulsation of fluid of increased pressure whereby said dog is caused to glide from its coöperating bell crank and the inclined extension remains in contact with its coöperating bell crank and a spring for closing the valve which has been disconnected from said dog.

7. A device for controlling gas lamps from a distance comprising a casing having an inlet for a gaseous fluid and an outlet leading to a burner, a valve located in said casing and controlling said outlet, a diaphragm adapted to be actuated by the fluid pressure for opening said valve and adapted to be further actuated by a pulsation of fluid of increased pressure to bring about a closing of said valve, a main spring coöperating with said diaphragm for counterbalancing the initial pressure of said fluid and a supplemental spring adapted to coöperate with said main spring for counterbalancing the increased pressure of said fluid.

8. A device for controlling gas lamps from a distance comprising a casing having an inlet for a gaseous fluid and an outlet leading to a burner, a valve located in said casing and controlling said outlet, a rod slidably mounted in said casing, a follower carried by said rod and adapted to open and close said valve by a two-part movement of said rod in the same direction, whereby the first part of said movement opens said valve and the further movement in the same direction brings about a closure of said valve, a diaphragm actuated by said fluid to slidably move said rod and follower, and a ratchet wheel in said casing arranged to transmit the movement of the diaphragm to said rod.

9. A device for controlling gas lamps from a distance comprising a casing having an inlet for a gaseous fluid and a plurality of outlets each leading to a burner, valves located in said casing and controlling said outlets, a rod slidably mounted in said casing, a follower carried by said rod and adapted to open and close said valves by a two-part movement of said rod in the same direction, whereby the first part of said movement opens said valves and the further movement in the same direction permits some of said valves to close and some to remain in their open position, a diaphragm actuated by said fluid to slidably move said rod and follower, and a ratchet wheel in said casing arranged to transmit the movement of the diaphragm to said rod.

In testimony whereof I have hereunto set my hand in the presence of two subscribing witnesses:

EMIL GOEPPER.

Witnesses:
BESSIE F. DUNLAP,
ROSE DIETZ.